US009620961B2

(12) United States Patent
Albayrak et al.

(10) Patent No.: US 9,620,961 B2
(45) Date of Patent: Apr. 11, 2017

(54) METHOD FOR SUPPLYING AN ELECTRIC DOMESTIC APPLIANCE FROM A LOW VOLTAGE SUPPLY NETWORK AND A DOMESTIC APPLIANCE SUITABLE FOR CARRYING OUT SAID METHOD

(75) Inventors: Hasan Gökcer Albayrak, Berlin (DE); Frank Böldt, Brieselang (DE)

(73) Assignee: BSH Hausgeraete GmbH, Munich (DE)

( * ) Notice: Subject to any disclaimer, the term of this patent is extended or adjusted under 35 U.S.C. 154(b) by 808 days.

(21) Appl. No.: 13/695,626

(22) PCT Filed: May 3, 2011

(86) PCT No.: PCT/EP2011/057020
§ 371 (c)(1),
(2), (4) Date: Nov. 1, 2012

(87) PCT Pub. No.: WO2011/147662
PCT Pub. Date: Dec. 1, 2011

(65) Prior Publication Data
US 2013/0043728 A1    Feb. 21, 2013

(30) Foreign Application Priority Data

May 5, 2010    (DE) .................. 10 2010 028 638

(51) Int. Cl.
*H02J 4/00*    (2006.01)
*H02J 3/38*    (2006.01)
(Continued)

(52) U.S. Cl.
CPC ............. *H02J 3/383* (2013.01); *H02H 3/033* (2013.01); *H02J 3/14* (2013.01); *H02J 3/386* (2013.01);
(Continued)

(58) Field of Classification Search
CPC .... H02J 3/14; H02J 3/383; H02J 3/386; H02J 7/35; H02J 9/002; H02J 2003/143;
(Continued)

(56) References Cited

U.S. PATENT DOCUMENTS 4,771,185 A    9/1988  Feron et al.
5,015,826 A    5/1991  Curti
(Continued)

FOREIGN PATENT DOCUMENTS

DE    3502826 A1    8/1985
DE    20302943 U1    5/2003
(Continued)

OTHER PUBLICATIONS

International Search Report PCT/EP2011/057020.
(Continued)

*Primary Examiner* — Thienvu Tran
*Assistant Examiner* — Brian K Baxter
(74) *Attorney, Agent, or Firm* — Laurence A. Greenberg; Werner H. Stemer; Ralph E. Locher

(57) ABSTRACT

A method for supplying internal consumers in a domestic appliance from a low voltage supply network, for example a photovoltaic power station or wind power station, includes classifying the internal consumers commensurate with a stored energy requirement of each internal consumer and supplying the internal consumers with energy commensurate with the classification. This protects against low voltage and excessive electric loads and against partial interruption of a treatment program for items when the low voltage supply is interrupted due to a temporary overload. The energy supply of the internal consumers is switched off in stages depending on their energy requirement and on their classification, when the energy available from the low voltage supply network is insufficient for supplying all (Continued)

internal consumers, and is switched back on again in stages, when the energy available from the low voltage supply network is once again sufficient for supplying all internal consumers.

18 Claims, 1 Drawing Sheet

(51) Int. Cl.
*H02H 3/033* (2006.01)
*H02J 3/14* (2006.01)
*H02J 7/35* (2006.01)
*H02J 9/00* (2006.01)
*A47L 15/00* (2006.01)

(52) U.S. Cl.
CPC .............. *H02J 7/35* (2013.01); *H02J 9/002* (2013.01); *A47L 15/0049* (2013.01); *D06F 2202/12* (2013.01); *H02J 2003/143* (2013.01); *Y02B 10/14* (2013.01); *Y02B 70/3225* (2013.01); *Y02B 70/3233* (2013.01); *Y02B 70/3266* (2013.01); *Y02E 10/563* (2013.01); *Y02E 10/566* (2013.01); *Y02E 10/763* (2013.01); *Y02E 10/766* (2013.01); *Y04S 20/222* (2013.01); *Y04S 20/225* (2013.01); *Y04S 20/242* (2013.01); *Y10T 307/469* (2015.04)

(58) Field of Classification Search
CPC .......... H02J 3/008; H02J 3/00; H02J 13/0086; H02J 13/0075; Y02B 70/3225; Y02B 10/14; Y02B 70/3233; Y02B 70/3266; Y04S 20/222; Y04S 20/225; Y04S 20/242; Y04S 50/10; H01R 25/003; G06F 1/266; H02H 3/033; A47L 15/0049; D06F 2202/12; Y02E 10/563; Y02E 10/566; Y02E 10/763; Y02E 10/766; Y02E 10/723; Y10T 307/469; G06Q 50/06; G06Q 30/04; G06Q 30/0283; G01R 21/133; G01R 22/00; G01R 19/2513; G01D 4/004
USPC ............ 307/39; 700/286, 291, 295; 702/61; 705/412
See application file for complete search history.

(56) References Cited

U.S. PATENT DOCUMENTS

| | | | |
|---|---|---|---|
| 6,188,142 B1 | 2/2001 | Loth-Krausser | |
| 2002/0024332 A1* | 2/2002 | Gardner | H02J 3/14 324/103 R |
| 2003/0009265 A1 | 1/2003 | Edwin | |
| 2005/0143865 A1* | 6/2005 | Gardner | H02J 3/14 700/291 |
| 2008/0272934 A1* | 11/2008 | Wang | H02J 3/14 340/870.11 |
| 2010/0008117 A1* | 1/2010 | Luthi | H02J 9/005 363/126 |
| 2010/0076615 A1* | 3/2010 | Daniel | F03D 9/00 700/293 |
| 2010/0089909 A1* | 4/2010 | Besore | G06Q 50/06 219/720 |
| 2010/0094475 A1* | 4/2010 | Masters | G06F 1/26 700/292 |
| 2010/0295376 A1* | 11/2010 | Black | H02J 7/0068 307/80 |
| 2011/0153104 A1* | 6/2011 | Drake | F24F 11/0086 700/291 |
| 2011/0202293 A1* | 8/2011 | Kobraei | G06Q 50/06 702/62 |
| 2011/0218690 A1* | 9/2011 | O'Callaghan | G06Q 50/06 700/295 |
| 2011/0241421 A1* | 10/2011 | Schaefer | H02J 1/08 307/9.1 |
| 2011/0264477 A1* | 10/2011 | Delany | G06Q 10/063 705/7.11 |
| 2012/0053739 A1* | 3/2012 | Brian | G06F 1/3203 700/287 |
| 2012/0197449 A1* | 8/2012 | Sanders | G05B 15/02 700/291 |
| 2012/0271475 A1* | 10/2012 | Wang | H02J 3/14 700/295 |
| 2012/0296490 A1* | 11/2012 | Fausak | G01D 4/002 700/297 |

FOREIGN PATENT DOCUMENTS

| | | |
|---|---|---|
| EP | 0072598 A1 | 2/1983 |
| EP | 0456872 A1 | 11/1991 |
| EP | 0953890 B1 | 7/2004 |
| JP | 2003032890 | 1/2003 |
| JP | 2008104269 | 5/2008 |
| RU | 2269862 C1 | 2/2006 |

OTHER PUBLICATIONS

National Search Report DE 10 2010 028 638.9.
English Translation of Notification of Reasons for Refusal for copending Japanese Application No. 2013-508469, mailed Oct. 28, 2013, 12 pages.

* cited by examiner

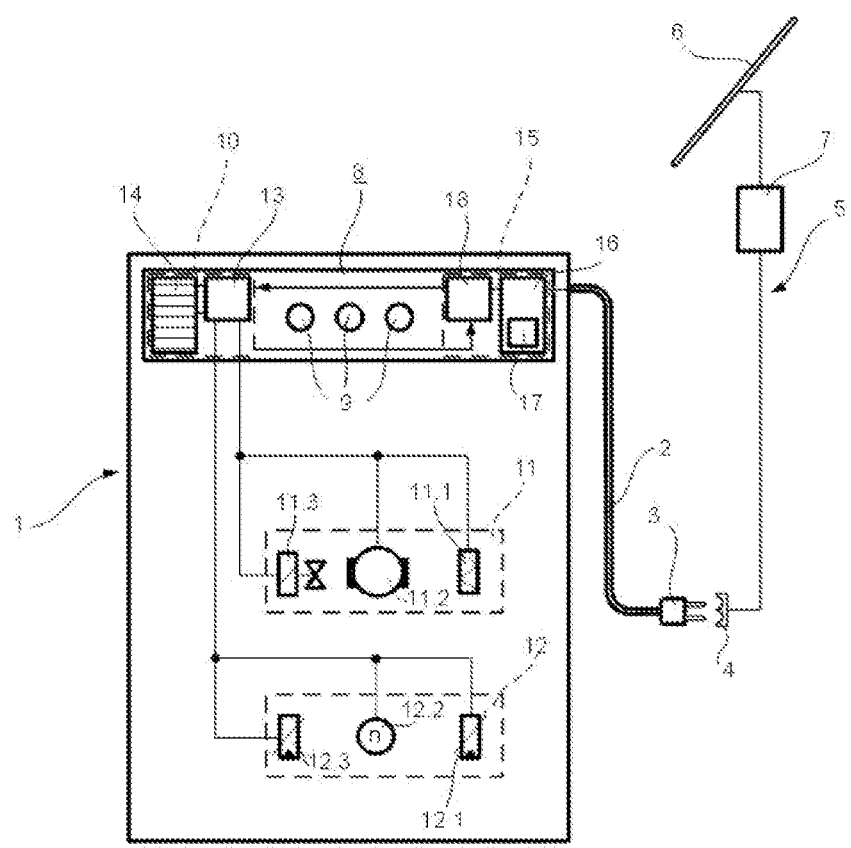

METHOD FOR SUPPLYING AN ELECTRIC DOMESTIC APPLIANCE FROM A LOW VOLTAGE SUPPLY NETWORK AND A DOMESTIC APPLIANCE SUITABLE FOR CARRYING OUT SAID METHOD

BACKGROUND OF THE INVENTION

The invention relates to a method for supplying an electric domestic appliance, with a circuit device for supplying internal consumers from a low voltage supply network, especially from a network which is supplied by a photovoltaic power station or wind power station, with a circuit arrangement for energy management through which the internal consumers are classified according to their energy requirements and are supplied with energy, and with a control arrangement and measurement sensors for the control of item treatment programs. The invention also further relates to a domestic appliance suitable for carrying out said method.

The direct supply of electric appliances by means of an extra low voltage from a low voltage supply network, for example an extra low voltage network operated by regenerative energy sources such as photovoltaic or wind power stations and buffered by batteries, is widely known. For example tools with rechargeable batteries or domestic appliances such as shavers are generally known. Such appliances no longer require power supplies in the electric appliances, through which a feed voltage for electric circuits of the control device for an electric appliance is established via a transformer and a rectifier and current smoothing circuit from the feed taken from a normal alternating current domestic network, by means of a single-phase AC voltage of 230 V~. The operation of high-power components, e.g. of heating devices and drive motors, continues to be possible for devices of which the control device is supplied through a rectifier and current smoothing circuit through the voltage (230 V~) offered by the domestic network. A general DC/DC converter in a circuit device for supplying internal consumers of an electric domestic appliance for conversion to a low voltage supply network is also conceivable.

In a solar power plant in accordance with DE 35 02 826 A1 a consumer is switched off on the one hand by a control device after the operating voltage at the rechargeable battery drops below a predetermined level. Such switching off protects the rechargeable battery against deep discharge. On the other hand the consumer is also automatically switched back on after the return of a suitably high supply voltage, wherein the voltage for switching back on is significantly higher than the switch-off voltage. This ensures that the battery, after the protective switch-off, is initially recharged completely or at least to a significant extent before the consumer is connected again. To this end the control device can also adapt the switching off and switching on to markedly different loads from consumers. Thus weak consumers, by contrast with stronger consumers, are already switched on again when the battery has not yet been completely recharged, but despite the switching back on of a weak consumer the charging operation can continue to be maintained. This especially enables longer operating pauses to be avoided, especially with weak consumers. However such a system is ill suited to electrical consumers having a number of internal consumers at least operated partly in parallel with different consumption characteristics.

A generic method and an arrangement for switching off consumers in accordance with DE 196 37 574 A1 make provision for a voltage source with a number of connected consumers not to switch off all consumers immediately when the voltage falls below a threshold value. Instead the immediate switching off of all consumers is avoided by a regulation circuit determining which of the connected consumers should be subject to an individually-staggered switch-off or should only be supplied with energy at a reduced level. In such cases the sequence of reductions or switch offs is defined in accordance with the type of consumer (heating device, power device) and in accordance with their energy requirement. Such a staggered switch-off in some cases entirely avoids one or another consumer being switched off. There is no provision for a differentiated switching back on. This is also why such a known method is unsuitable for electric domestic appliances with a number of internal consumers.

Charging and discharging management is already known from DE 203 02 943 U1, for charging batteries from a number of different energy sources in the most protective manner possible, avoiding overcharging and undercharging and making the optimum use of the individual energy sources. In such cases, for the operation of electric consumers, the energy taken from them, e.g. for observing the discharge currents, is also monitored, wherein no further details are provided about the influence from the different measured discharge currents. Otherwise the management primarily relates to taking account of all possible known types of energy source for the charging process of one or more rechargeable batteries. A solution for the management of a number of internal consumers in an electric domestic appliance cannot be derived from this patent.

BRIEF SUMMARY OF THE INVENTION

The underlying object of the invention is to specify a method described above and a suitable domestic appliance for carrying out the method through which electric low voltage sources, especially such as are operated or buffered with rechargeable batteries, e.g. solar or wind power plants, are protected against electric loads that are too large. Above all however processing programs of program-controlled electric domestic appliances are to be protected from incomplete termination, if before or during the course of a processing program the low voltage supply fails because of a temporary overload. Such protection against incomplete termination is to be provided especially for the case in which the domestic appliance or individual consumers of the domestic appliance are supplied from an external low voltage supply network which provides a protected extra low voltage. The protected extra low voltage is to be understood as an AC voltage of less than or equal to 50 V or a DC voltage of less than or equal to 120 V.

This object is achieved in various ways. On the one hand, in accordance with the identifying features of the invention, the inventive solution can consist of a method in which the energy requirement of each internal consumer is known and it is stored in the circuit device that the supply of the internal consumers will be switched off in a staggered manner as a function of their energy requirement and of their consumption profile, if the energy offered by the low voltage supply network becomes too low to feed all internal consumers, and that the switching back on of the internal consumers is staggered in accordance with their dependency. This makes it possible for the processing program to continue in most cases, since specific consumers in the electric appliance are readily able to be switched off temporarily, without immediately calling into question the success of the processing program. For example the heating of a washing machine or of a dishwasher can readily be switched off temporarily without generally endangering the success of the cleaning. As soon as the low voltage supply network again has sufficient power, the lost heating energy can be recovered again. In some cases this makes the processing program longer, but mostly this is tolerable.

More secure in this respect is a second inventive solution with the identifying method features of the invention in which, before a selected processing program is started, the total energy requirement of all internal consumers depending on the assigned item processing is determined over the entire processing program and is compared to the current energy offered by the low voltage supply network, and that the processing program is only started if the comparison has resulted in a higher energy offer than the assigned total energy requirement. In this case the method first waits until the performance of the low voltage supply network is again sufficient before the selected operating program is automatically started at all. On the one hand this has the advantage that the operating program can mostly be ended completely and without restrictions—of the heating energy to be used for example. However the tolerance of having to wait longer for the beginning and the execution of the operating program than with an immediate start is then demanded of the operator. Since however operators of low voltage networks of the said type know that the supply security is not always one hundred percent, this tolerance will be able to be taken as given. This naturally also applies in respect to the restriction in application of the first solution. For electric domestic appliances above all of which for example the processing programs do not allow any kind of interruption or lengthening or reduction of the heat energy applied, like thermal foodstuff preparation devices such as cookers or ovens or hobs, the second solution is to be preferred however.

For the second solution it is of particular advantage if, in accordance with a continuation of the inventive method, in the determination of the total energy requirement, the most unfavorable conditions are used as a basis. For example for a washing machine or a dishwasher the energy requirement of the heating device should be calculated on the basis of a lowest possible start temperature of the water to be heated up. The energy requirement of the drive motor should be set to the most difficult possible operating conditions in a washing machine, for the greatest torque to be expected of the filled laundry drum for example.

Both inventive solutions are especially of advantage if a protected extra low voltage is provided by the low voltage network. In this case all internal consumers (11) of the domestic appliance are supplied from the low voltage supply network (5) of the protected extra low voltage class. When the domestic appliance contains consumers which require a higher operating voltage than the protected extra low voltage, for supplying such consumers, the domestic appliance preferably also contains a transformer which transforms the protected extra low voltage to the operating voltage of these consumers.

However a mixed form of the two solutions is also conceivable; this is because even if there is generally a wait until the energy supply of the network is sufficient for the interrupted processing of a selected processing program, a deterioration of the energy supply of the low voltage supply network is also possible during this processing. But then too the program currently running should also be able to be continued to its end. A switchover to the mode in accordance with the first-mentioned solution would then be more advantageous than a complete abortion of the program currently running.

A further very advantageous development of the method of the second solution arises if, in the event of an operating program having been halted as a result of not enough power being available from the low voltage supply network, the performance is constantly monitored and the operating program is started automatically as soon as the power exceeds the total energy requirement. Then the operator of a program-controlled domestic appliance can already give the start command for the selected program without having to worry about whether the program can already start as a result of available power of the low voltage supply network or cannot be started until later because of performance capability not currently available.

The desired object is further achieved by providing a domestic appliance having the features of the invention.

One of these methods can be executed on the basis of the features identified in the subclaims in any given, sensible combination, without departing from the general inventive thinking. Preferred developments of the method also analogously represent preferred developments of the domestic appliance and vice versa.

The inventive methods are explained in greater detail on the basis of an exemplary embodiment for a program-controlled domestic appliance shown in the drawing. The single FIGURE shows a schematic diagram of a domestic appliance with devices for program control and for selecting one of a number of predetermined programs. This domestic appliance can be any type of program-controlled domestic appliance, such as washing machines, washer/dryers, tumble dryers, dishwashers, cookers, ovens, hobs etc.

BRIEF DESCRIPTION OF THE DRAWINGS

Both solutions explained above, as well as their specific variants, are described on the basis of the same FIGURE. For this individual modules of the program-controlled domestic appliance have different internal designs, an aspect which is only dealt with in the sense of its functional contents since the person skilled in the art is readily able to present the respective function in terms of circuit technology.

DETAILED DESCRIPTION OF EXEMPLARY EMBODIMENTS OF THE PRESENT INVENTION

The domestic appliance 1 shown is able to be connected via a connecting lead 2 with a plug 3 to an outlet 4 of a low voltage power supply network 5—referred to below as the network 5—which essentially represents a voltage source 6—shown here schematically as a photovoltaic solar generator, but a wind generator system can also be used instead—and a transformer 7. The transformer 7, depending on requirements, can contain time control programs, voltage monitoring and smoothing devices, remote-control devices or the like. With the transformer 7 a power supply network 5 with protected extra low voltage is especially provided. It could however also be configured for transforming the DC voltage of the generator 6 provided into normal AC voltage of 230 V~. The transformer 7 can however also—if necessary—contain an accumulator for collecting the harvested electrical energy or the transformer 7 can be connected downstream from the accumulator. The transformer 7 can be dispensed with if the voltage source 6 provides a voltage with which the domestic appliance 1 can be operated.

In the event that the domestic appliance 1 is to be operated with a protected extra low voltage and that it contains consumers which demand a higher operating voltage, the domestic appliance can also contain a transformer for supplying such consumers, which transforms the protected extra low voltage to the operating voltage of these consumers.

The circuit device 8 of the electric domestic appliance 1 contains input devices 9 for selecting programs and individual parameters of such programs for treatment of items, e.g. foodstuffs drinks and process water, dishes or laundry. The circuit device 8 further contains a program control arrangement 10 for supplying the internal consumers 11 with energy and for measuring and evaluating signals of the sensors 12, which signal the states created by the internal consumers 11 to the program controller 10. The consumers 11 typically include thermal consumers 11.1 (heating device), motorized consumers 11.2 (drive motors for various movement purposes) and solenoids 11.3 (valve controls). Corresponding sensors 12.1 for heat measurement, 12.2 for rotational speed measurement and 12.3 for level measurement (e.g. of washing liquor) represent parameter measurement within the domestic appliance 1. The program control arrangement 10 contains a program control device 13 and a memory 14 for the individual values of the energy requirement of each individual consumer 11.1 to 11.3.

On the other hand the circuit device 8 contains an energy manager 15 with a network connection device 16 of the domestic appliance 1 to which the connecting lead 2 with plug 3 also belongs. In the network connecting device 16 a monitor 17 observes the performance of the network 5. A comparator 18 decides whether the totality or individual parts of the internal consumers 11 can be supplied with energy.

In the method according to the first solution (claim 1), after the selection of a desired processing program at the input device 9 by the program control arrangement 10 on the basis of the values for the respective energy requirement of the internal consumers 11 stored in the memory 14 and on the basis of the application program of these consumers, the energy requirement of each consumer 11.1 to 11.3 is determined over the entire processing program and is provided for comparison with the performance of the network 5.

The program is now started, provided that the network 5 is currently capable of performing at all. During the execution of the handling program the performance of the network 5 is now checked continuously by the monitor 17 and the result of the check is signaled to the comparator 18. Since the comparator 18 is also constantly notified by the program control device 13 as to the level of energy demands of the consumer or consumers 11 which in the present program step would absolutely have to be supplied with energy, the comparator 18 can always decide whether there is energy present at all and possibly whether there is still enough energy available, and can return this information to the program control device 13 as a response. Accordingly the program control device 13 can temporarily not supply one or another consumer 11.1 to 11.3—if necessary—with energy until the comparator 18, as a result of an actual increase in the performance of the network 5, can enable further supply to internal consumers 11 again.

With the thermoelectric devices a temporary switching-off can frequently affect the corresponding consumers, namely heating devices 11.1. A treatment program running with the use of thermal energy can under some circumstances temporally dispense with further input of heat energy and its success in relation thereto can still be achieved by compensating extension of the treatment. This could for example be applied in washing or dishwashing machines or devices for preparation of water.

For electric domestic appliances 1 of which the program execution should rather not be interrupted, such as baking or cooking devices for example, which must follow a thermal program sequence tailored to the handling of items to be cooked, if cooking is to be successful and otherwise does not contain any internal consumers 11 which can be temporally switched off, a use of the second solution (claim 6) is to be given preference.

In this second solution, before a treatment program selected at the input device 9 is started by the program control device 13 based on the values stored in the memory 14 for the respective power of the internal consumers 11 to be used and on the basis of their usage profile in the selected handling program, the total energy requirement is calculated. That is the sum of all the individual energy use for each internal consumer 11.1 to 11.3 over the entire program sequence. This overall energy requirement is notified to the comparator 18 in the energy manager 15, which compares it to the current energy offered by the network 5. Instead of or in addition to thereto, this comparison can also contain a maximum peak power of all simultaneously used internal consumers 11 in each case with the actual performance of the network 5. If the result of this comparison is positive in each case the handling program can be started. Otherwise the method waits until such performance is available before starting the program. The monitor 17 is used for this purpose, which instigates the comparison continuously or at intervals.

But the performance of the network 5 can also collapse during execution of a handling program once it has been started with the use of the second solution and a positive comparison, so the fault free processing can no longer take place. Since the energy management 15 is in constant use, the comparator 18 could in such a case issue a negative message to the program control device 13 during the execution of the treatment program, in response to which the program control device must make a decision about an immediate abort of the treatment program executing or continuing the program under the conditions of the first solution. If restrictive further operation under conditions of the first solution can still be tolerated, it would be advantageous to switch over the operating mode to the first solution from this time onwards.

LIST OF REFERENCE CHARACTERS

1 Electric domestic appliance
2 Connecting lead
3 Mains plug
4 Outlet
5 Low voltage supply network, network
6 Photovoltaic generator, generator
7 Transformer
8 Circuit device
9 Input device
10 Program control arrangement
11 Internal consumer
11.1 Internal consumer, heating device
11.2 Internal consumer, drive motor
11.3 Internal consumer, solenoid, valve control
12 Sensors
12.1 Sensor for heat measurement
12.2 Speed measurer 12.3 Level sensor
13 Program control device
14 Memory
15 Energy manager
16 Network connection device
17 Monitor
18 Comparator

The invention claimed is:

1. A method for supplying an electric domestic appliance, the domestic appliance having a circuit device for supplying internal consumers from a low voltage supply network and a program control arrangement and measurement sensors for controlling treatment programs for items, the method comprising:
  storing an energy requirement of each internal consumer in a circuit device for energy management,
  classifying the internal consumers commensurate with the stored energy requirement of each internal consumer,
  supplying the internal consumers with energy commensurate with the classification, and
  switching off the energy supply of the internal consumers in stages depending on their energy requirement and on their classification, when the energy available from the low voltage supply network is insufficient for supplying all internal consumers, and switching the internal consumers back on again in stages depending on their energy requirement and on their classification, when the energy available from the low voltage supply network is once again sufficient for supplying all internal consumers.

2. The method of claim 1, wherein the low voltage supply network receives power from a photovoltaic power station or from a wind power station.

3. The method of claim 1, further comprising
  providing a protective extra-low voltage from the low voltage supply network, and
  supplying all internal consumers with the protected extra-low voltage from the low voltage supply network.

4. A domestic appliance, comprising:
  internal consumers,
  a circuit device configured to supply the internal consumers from a low voltage supply network and comprising a memory area for storing energy requirements of each individual internal consumer,
  a circuit arrangement for energy management configured to classify the internal consumers commensurate with the energy requirement for each internal consumer and to supply the internal consumers commensurate with the classification, and
  a program control arrangement and measurement sensors for controlling treatment programs for items,
  wherein the circuit arrangement is further configured to switch off the energy supply of the internal consumers in stages depending on their energy requirement and on their classification, when the energy available from the low voltage supply network is insufficient for supplying all internal consumers, and to switch the internal consumers back on again in stages depending on their energy requirement and on their classification, when the energy available from the low voltage supply network is once again sufficient for supplying all internal consumers.

5. The domestic appliance of claim 4, wherein the low voltage supply network receives power from a photovoltaic power station or a wind power station.

6. The domestic appliance of claim 4, wherein an energy requirement of a thermal consumer is stored as a function of a switch-on frequency of a selected program or a temperature of a medium to be heated, or both.

7. The domestic appliance of claim 4, wherein the circuit device comprises a comparator which outputs a positive output signal enabling the selected program to be continued when the available energy is greater than the energy requirement for the selected program, and which outputs a negative output signal when the energy requirement for the selected program is greater than the available energy.

8. The domestic appliance of claim 4, wherein the circuit device is configured to decide whether or not to continue the treatment program depending on whether success of the treatment program is not affected, or only slightly affected, or is in question when an internal consumer is switched off.

9. The domestic appliance of claim 4, wherein the domestic appliance is configured for operation on a low voltage supply network which provides a protective extra-low voltage.

10. A method for supplying an electric domestic appliance, the domestic appliance having a circuit device for supplying internal consumers from a low voltage supply network and a program control arrangement and measurement sensors for controlling treatment programs for items, the method comprising:
  classifying the internal consumers commensurate with the stored energy requirement of each internal consumer,
  supplying the internal consumers with energy commensurate with the classification,
  before a selected treatment program is started, determining a total energy requirement of all internal consumers over the entire treatment program, with the total energy requirement depending on treatment of the items, and comparing the total energy requirement with an energy currently available from the low voltage supply network,
  starting the treatment program only when the energy currently available from the low voltage supply network is greater than the total energy requirement;
  monitoring the total energy available from the low voltage supply network;
  halting the treatment program when insufficient energy is available from the low voltage supply network to complete the treatment program; and
  when the treatment program is halted due to insufficient energy available from the low voltage supply network, constantly monitoring the available energy and automatically starting the treatment program when the available energy exceeds the total energy requirement.

11. The method of claim 10, wherein the low voltage supply network receives power from a photovoltaic power station or a wind power station.

12. The method of claim 10, wherein the total energy requirement is determined based on most unfavorable conditions.

13. The method of claim 10, further comprising
  providing a protective extra-low voltage from the low voltage supply network and
  supplying all internal consumers with the protected extra-low voltage from the low voltage supply network.

14. A domestic appliance, comprising:
  internal consumers,
  a program control arrangement and measurement sensors configured to control treatment programs for items,
  a circuit device for supplying the internal consumers from a low voltage supply network and comprising a memory area for storing a total energy requirement of all internal consumers for all selectable treatment programs, a circuit arrangement for energy management configured to classify the internal consumers commensurate with their energy requirement, supply the internal consumers with energy commensurate with the classification, before a selected treatment program is started, determine a total energy requirement of all internal consumers over the entire treatment program, with the total energy requirement depending on treatment of the items, and compare the total energy requirement with a energy currently available from the low voltage supply network, and start the treatment program only when the energy currently available from the low voltage supply network is greater than the total energy requirement;

monitor the total energy available from the low voltage supply network;

halt the treatment program when insufficient energy is available from the low voltage supply network to complete the treatment program; and when the treatment program is halted due to insufficient energy available from the low voltage supply network, constantly monitoring the available energy and automatically starting the treatment program when the available energy exceeds the total energy requirement; and said circuit device comprising a comparator configured to output a positive output signal enabling the selected program to be continued when the available energy is greater than the energy requirement for a selected program, and to output a negative output signal when the energy requirement for the selected program is greater than the available energy.

15. The domestic appliance of claim 14, wherein the internal consumers are supplied with energy from a network of a protective extra-low voltage class or from a network supplied from a photovoltaic power station or wind power station.

16. The domestic appliance of claim 14, wherein the total energy requirement of all internal consumers is formed by storing a respective energy requirement of a thermal consumer depending on a switch-on frequency of a selected program or a temperature of a medium to be heated, or both.

17. The domestic appliance of claim 14, wherein the circuit device comprises a monitor for monitoring performance of the low voltage supply network.

18. The domestic appliance of claim 14, wherein the domestic appliance is configured for operation on a low voltage supply network which provides a protective extra-low voltage.

* * * * *